United States Patent [19]

Swiatosz

[11] 4,439,341
[45] Mar. 27, 1984

[54] SMOKE GENERATOR FOR USE WITH WATER AND SMOKE GENERANT

[75] Inventor: Edmund Swiatosz, Maitland, Fla.

[73] Assignee: The United States of America as represented by the Secretary of the Navy, Washington, D.C.

[21] Appl. No.: 477,208

[22] Filed: Mar. 21, 1983

[51] Int. Cl.³ .................... C09K 3/30; B01J 13/00; B05B 1/24
[52] U.S. Cl. .................... 252/305; 252/359 R; 252/359 CG; 102/334; 219/271; 219/362; 239/163
[58] Field of Search ............... 252/305, 359 A, 359 R, 252/359 CG; 239/135, 136; 219/271, 272, 273, 275, 276, 362; 102/334

[56] References Cited

U.S. PATENT DOCUMENTS

| | | | |
|---|---|---|---|
| 2,686,160 | 8/1954 | Kell et al. | 252/305 |
| 2,805,615 | 9/1958 | Luse, Jr. et al. | 252/305 |
| 2,944,029 | 7/1960 | Jones et al. | 252/305 |
| 4,349,723 | 9/1982 | Swiatosz | 252/359 R |

Primary Examiner—Richard D. Lovering
Assistant Examiner—Anne Brookes
Attorney, Agent, or Firm—Robert F. Beers; Robert W. Adams; Robert J. Veal

[57] ABSTRACT

A smoke generator utilizes a boiler chamber within which a mixture of water and liquid smoke generant are heated above the boiling point of water, thereby producing free steam confined within the chamber. The steam and heated liquid are independently removed from the chamber and recombined at optimum pressure and flow in a special atomizing nozzle to generate a smoke of particulate size under ten microns.

16 Claims, 1 Drawing Figure

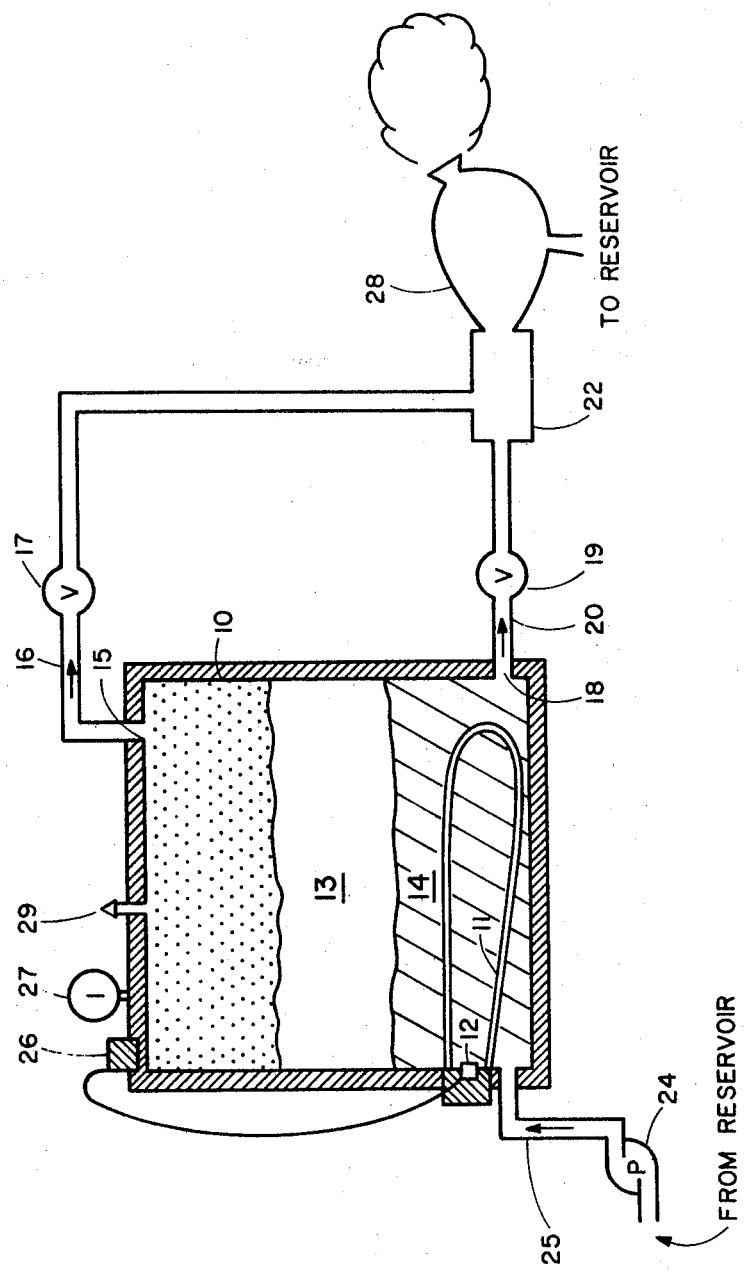

SMOKE GENERATOR FOR USE WITH WATER AND SMOKE GENERANT

BACKGROUND OF THE INVENTION

1. Field of the Invention

The present invention relates generally to the field of training devices and in particular to training devices wherein simulated smoke is employed. More particularly, the present invention relates to the field of smoke generators for use in firefighting trainers. In even greater particularity, the present invention may be described as a smoke generator which utilizes water and a non-miscible liquid as its generants.

2. Description of the Prior Art

Smoke generators of a general nature are well known. As pointed out in U.S. Pat. No. 2,686,160, issued Aug. 10, 1954, a number of different methods and apparatus for forming oil smokes and fogs have been tried, including: (1) incomplete combustion of the oil; (2) vaporizing an oil in a chamber by indirect heat exchange; (3) spraying an oil against a heated surface for evaporation; and (4) vaporization of a fog-producing oil with steam. U.S. Pat. No. 2,686,160 taught vaporization of an oil spray by hot flue gases for use as screens for military blanketing purposes. In 1958, U.S. Pat. No. 2,850,615 was issued to D. F. Luse et al on a device of type (2) above, wherein glycerin was sprayed on a hot platen to simulate an electrical fire in an aircraft. In 1966, U.S. Pat. No. 3,249,553 was issued to S. B. Steinberg on a smoke generator employing a plurality of venturi spray heads to produce a smoke from dioctylphthalate. Also in 1966, U.S. Pat. No. 3,250,723 was issued to B. C. Fortney on a device of type (1) above. In 1982, U.S. Pat. No. 4,330,428 was issued to E. W. Clifford on a specialized device of type (1) above for use in testing the seals of packages.

These and other methods of smoke production are available for use in training devices; however, due to safety and environmental considerations such as material decomposition and explosion hazards, a very limited number of smoke agent substances are applicable. One such substance, the use of which the applicant is familiar with, is butylated triphenol phosphate, which is reportedly non-toxic and nonflammable. However, a special atomizing nozzle is required to mix the liquid with high temperature air under pressure to produce smoke particles. The heated system presents problems when smoke is ducted because the smoke generant tends to decompose with prolonged heat. Although the smoke is nonflammable, autoignition of the liquid has been observed when the liquid and the high temperature air were inadvertently mixed outside the nozzle.

SUMMARY OF THE INVENTION

It is an object of the present invention to provide a smoke generator which avoids fire hazards and provides a non-toxic smoke.

Another object of the invention is to produce a training smoke at a lower temperature, thus minimizing decomposition of the smoke generant.

Yet another object of the invention is the provision of a simple low cost smoke generator.

These and other objects are met in the instant method and apparatus wherein a boiler chamber is used to raise the temperature and pressure of the smoke generant while creating steam from water within the chamber, the steam and heated generant fluid are independently removed from the chamber and combined via an atomizing nozzle to produce a "smoke."

The features of the invention desired to be protected are set forth in the appended claims. The invention itself together with further objects and advantages thereof, may best be understood by referring to the following description taken in conjunction with the appended drawings.

BRIEF DESCRIPTION OF THE DRAWINGS

The FIGURE is a cross-sectional view of the smoke generator apparatus.

DESCRIPTION OF A PREFERRED EMBODIMENT

Referring to the FIGURE, a boiler chamber 10 has disposed within its lower portion a heating element 11, preferably an electrical coil, such that said element 11 may provide heat to fluids contained within chamber 10 to maintain the fluid at a predetermined temperature which may be monitored by a sensor 12 associated with element 11. The desired temperature will be above the boiling point of water in order to produce steam from the water 13 contained within the chamber. In the preferred embodiment water 13 floats on top of a smoke generant 14, such as butylated triphenol phosphate; alternatively, water 13 may be in solution with smoke generant 14 as is the case when carbowax polyethylene glycol 200 (PEG 200) is used. In either case free steam is generated.

An outlet 15 is provided in the upper portion of chamber 10 for the removal of steam via conduit 16. The flow and pressure of the steam is controlled by an inline regulator 17. A second outlet 18 is provided in the lower portion of chamber 10 for the removal of smoke generant 14 via conduit 20, wherethrough the flow rate and pressure are controlled by a second regulator 19. Conduits 16 and 20 feed into an atomizing nozzle 22.

A make-up fuel pump 24 is connected between a reservoir of smoke generant and said chamber 10 via conduit 25. A pressure controller 26 and pressure gauge 27 are provided, as is a relief valve 29.

In operation with butylated triphenol phosphate (triaryl phosphate) as smoke generant 14, heating element 11 supplies heat directly to smoke generant 14, raising the temperature thereof to between 400°–450° F. Inasmuch as triaryl phosphate is not miscible with water and has a specific gravity of 1.10 to 1.21, an interface is formed between said smoke generant 14 and water, such that said water is heated by secondary heat transfer to between 300° and 340° F., thereby generating steam which is maintained within chamber 10 at a pressure of 50 to 100 psi.

In addition to providing the modus for generating steam, the application of heat in the above manner also reduces the viscosity of smoke generant 14, thereby facilitating the shearing action of atomizing nozzle 22.

When a water soluble smoke generant 14 is used, such as a 10% water 90% carbowax polyethylene glycol 200 (PEG 200) solution, no interface is created; however, the steam is still generated and the viscosity of generant 14 is still reduced.

Steam enters nozzle 22 via conduit 16 and smoke generant 14 enters via conduit 19 at a flow and pressure determined by their respective regulators 17 and 19. Nozzle 22 may be a Model M500, by Flow Kinetics, Inc. Within nozzle 22, smoke generant 14 is sheared into particles in the sub-forty micron range and mixed with the steam to produce a simulated smoke which is discharged from nozzle 22. Preferentially, a centripetal trap 28, of which there are a variety, can be used to trap particles in excess of ten microns in diameter at the outlet of nozzle 22. Such particles are returned to the reservoir and reintroduced to the apparatus by pump 24.

It is to be understood that although all of the components of the apparatus described herein are individually well known, it is believed that this combination for use in the manner claimed and described presents patentable improvement over the prior art. While a particular embodiment of the invention has been shown and described herein, it is not intended that the invention be limited to such disclosure, but that changes and modifications can be made and incorporated within the scope of the appended claims.

I claim:

1. An apparatus for generating smoke comprising, in combination:
- means for heating a quantity of liquid comprising smoke generant liquid and water within a container such that the water held within said container is heated above its boiling point;
- means for removing steam under pressure from said container, operably connected thereto;
- independent means for removing liquid from said container, operably connected thereto;
- means for mixing said steam and said liquid in such a manner as to generate a smoke via an outlet and having inputs from said steam removing means and said liquid removing means; and
- means for replenishing said smoke generant liquid and said water, operably connected to said container.

2. The apparatus of claim 1 wherein said heating means comprises:
- a boiler chamber having a plurality of inlet and outlet orifices, and having an upper and lower portion; and
- means for heating said smoke generant liquid disposed within said lower portion of said boiler chamber.

3. The apparatus of claim 2 further comprising:
- means for controlling the pressure within said chamber, operably connected thereto; and
- means for sensing the temperature within said chamber and controlling said heating means in accordance therewith.

4. The apparatus of claim 1, wherein said steam removing means comprises:
- a conduit operably connected to receive steam from said container; and
- valve means for controlling the rate of flow and pressure of the steam removed via said conduit, operably connected thereto.

5. The apparatus of claim 1 wherein said mixing means is an atomizing nozzle designed to shear said liquid into vapor and mix said vapor with said steam.

6. The apparatus of claim 1 wherein said liquid is butylated triphenol phosphate.

7. The apparatus of claim 1 wherein said liquid is glycerin.

8. The apparatus of claim 1 wherein said liquid is carbowax polyethylene glycol 200 (PEG 200).

9. The apparatus of claim 1 wherein said replenishing means comprises:
- a make-up fuel pump;
- a supply of said liquid;
- conduit means connecting said pump and said supply; and
- conduit means connecting said pump and said container.

10. An apparatus for generating smoke comprising in combination:
- a boiler chamber having a plurality of inlet and outlet means;
- means for supplying heat to fluids within said chamber disposed within said lower portion of said boiler chamber;
- a first conduit operably connected to said chamber for removing gaseous effluents generated within said chamber;
- a second conduit operably connected to said chamber for removing non-gaseous fluids therefrom;
- an atomizing nozzle operably connected to receive input from said first and second conduits, and having an output; and
- means for supplying water and a smoke generant liquid to said chamber.

11. The apparatus according to claim 10 wherein said heat supplying means is an electrical heater coil.

12. The apparatus of claim 10, further comprising:
- a first regulator for controlling the flow and pressure within said first conduit; and
- a second regulator for controlling the flow and pressure within said second conduit.

13. A method of generating smoke comprising the steps of:
- placing a liquid smoke generant within a container;
- placing water within said container with said liquid;
- applying heat within said container sufficient to generate steam from said water;
- withdrawing controlled quantities of said steam and smoke generant by independent means;
- mixing said steam and smoke generant such that a smoke is formed having the majority of its particles of a size less than ten microns in diameter.

14. The method of claim 13 further comprising the steps of regulating the temperature and pressure within said container.

15. The method of claim 13, wherein said withdrawing step further comprises the steps of:
- regulating the flow and pressure of said steam withdrawn from said container to achieve an optimum mix with said smoke generant;
- regulating the flow and pressure of said smoke generant withdrawn from said container to achieve an optimum mix with said steam.

16. The method of claim 13 wherein said liquid placing step includes the steps of:
- sensing the amount of liquid smoke generant within said chamber relative to a predetermined volume; and
- maintaining a flow of said liquid smoke agent into said container sufficient to maintain said volume.

* * * * *